(12) United States Patent
Lian

(10) Patent No.: US 9,311,017 B2
(45) Date of Patent: Apr. 12, 2016

(54) EXTERNAL DEVICE EXTENSION METHOD FOR ENABLING AN EXTERNAL DEVICE TO BE OPERATED BY A HOST WITHOUT INSTALLING A DRIVER

(76) Inventor: Xin Lian, Shenzhen (CN)

(*) Notice: Subject to any disclaimer, the term of this patent is extended or adjusted under 35 U.S.C. 154(b) by 106 days.

(21) Appl. No.: 14/130,910

(22) PCT Filed: Feb. 22, 2012

(86) PCT No.: PCT/CN2012/071422
§ 371 (c)(1),
(2), (4) Date: Jan. 4, 2014

(87) PCT Pub. No.: WO2013/029354
PCT Pub. Date: Mar. 7, 2013

(65) Prior Publication Data
US 2014/0156885 A1    Jun. 5, 2014

(30) Foreign Application Priority Data
Aug. 26, 2011 (CN) .......................... 2011 1 0249058

(51) Int. Cl.
G06F 13/00 (2006.01)
G06F 9/44 (2006.01)
G06F 3/06 (2006.01)
G06F 13/10 (2006.01)
G06F 17/30 (2006.01)

(52) U.S. Cl.
CPC ............ *G06F 3/0653* (2013.01); *G06F 3/0608* (2013.01); *G06F 3/0673* (2013.01); *G06F 13/105* (2013.01); *G06F 17/30067* (2013.01)

(58) Field of Classification Search
CPC ............................ G06F 3/0653; G06F 3/0608
USPC .................... 710/72–74, 8–10; 713/1, 2, 100
See application file for complete search history.

(56) References Cited

U.S. PATENT DOCUMENTS 6,182,212 B1 * 1/2001 Atkins ................... G06F 9/4451
713/1
6,442,570 B1 * 8/2002 Wu .................... G06F 17/30578
707/621

(Continued)

*Primary Examiner* — Tammara Peyton
(74) *Attorney, Agent, or Firm* — Raymond Y. Chan; David and Raymond Patent Firm

(57) ABSTRACT

The present invention relates to an external device extension method and an external device. The external device is provided with a storage device interface and firmware for implementing operation requests of standard functions of the storage device interface. When the external device is connected to a host, the firmware communicates with the host according to standards of the storage device interface, so that the external device is identified by the host as a standard external storage device, and one or more of operation names, parameter names, data names, and/or device status names supported by the external device are simulated as one or more directories and/or files. Upon receiving a standard directory and/or file read/write request from the host, the external device executes a corresponding external device operation instruction, processes written data, and returns, according to the read request, data formatted according to the request from the host. The use of the external device does not need any driver to be installed, and all functions of the external device can be accessed and used, so as to make it possible that some smart appliances using embedded software can be connected to and use the external devices.

12 Claims, 2 Drawing Sheets

(56) References Cited

U.S. PATENT DOCUMENTS

| | | | |
|---|---|---|---|
| 6,986,030 B2* | 1/2006 | Shmueli | G06F 21/34 713/1 |
| 8,041,863 B2* | 10/2011 | Kwan et al. | 710/72 |
| 8,458,450 B2* | 6/2013 | Mulcahy | G06F 9/4411 710/8 |
| 8,473,941 B2* | 6/2013 | Tsvi et al. | 717/174 |
| 8,972,976 B2* | 3/2015 | Lu et al. | 717/178 |
| 2002/0042267 A1* | 4/2002 | Kim et al. | 455/418 |
| 2002/0147912 A1* | 10/2002 | Shmueli | G06F 21/34 713/182 |
| 2003/0110371 A1* | 6/2003 | Yang | G06F 9/4451 713/100 |
| 2007/0214187 A1* | 9/2007 | Thomas et al. | 707/200 |
| 2008/0126791 A1* | 5/2008 | Weiner | G06F 9/44584 713/100 |
| 2012/0047277 A1* | 2/2012 | Keidar et al. | 709/230 |
| 2014/0325533 A1* | 10/2014 | Wu | G06F 9/4411 719/321 |

\* cited by examiner

EXTERNAL DEVICE EXTENSION METHOD FOR ENABLING AN EXTERNAL DEVICE TO BE OPERATED BY A HOST WITHOUT INSTALLING A DRIVER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to an external device extension method and an external device for various kinds of hosts, and more particularly to an external device extension method and an external device for computers and smart appliances.

2. Description of Related Arts

A host is connected to an external device for extending its applications.

A host like a computer system can employ numerous external devices. A conventional external device extension method is generally achieved by using the universal interfaces of the host and installing specified applications and drivers on the host.

This method is convenient and effective when the host incorporates a combination of Window operating system and Intel processor. However, because the number of the versions of the operating systems is growing more and more, and the driver package is getting larger and larger, its use and maintenance becomes more and more difficult. Many external devices have to select to support one or several limited number of versions, so that these external devices cannot be used on the older hosts, and even are not usable on the newer hosts.

Much effort has been expended in facilitating improved use of external devices.

Microsoft Corporation has defined four types of USB devices that do not require installing additional drivers under the operating system of Windows XP SP2 and the operating systems thereafter, those USB devices are classified into four following types.

1. USB Video Class (UVC), which mainly refers to cameral like products.
2. USB Audio Class (UAC), which mainly refers to USB sound cards.
3. USB Human Interface Device, which mainly refers to mouse and keyboards of USB interface, and the like.
4. USB Mass Storage Device, which main refers to USB flash drives.

An agreement has been made that each type of above devices is designed to comply with a predetermined specification, a universal driver associated with the predetermined specification is developed and integrated into the operating system. The universal drivers enable the normal operations of an external device, as long as the external device complies with the predetermined specification. This has significantly brought down the difficulties for the users of the Windows operating system.

With the development of computer science, the situation of the only combination of Windows operating system and Intel processor has changed. The use of Linux operating systems and other embedded operating systems, ARM and MIPS based processors has become popular. The current external device extension methods and external devices cannot meet these requirements.

Although, smart appliances like hosts, such as cell phones, TV sets, Mobile Internet Devices, Pictorial Navigation Displays, media players, webcams, digital cameras, digital videos, and netbooks, with MIPS or ARM processors have a larger computing capability than the conventional computers and also support some universal interfaces, unlike the computers, they cannot use and connect to a plurality of external devices according to the current external device extension methods. One reason is that some hosts don't use the specific combination of Windows operating system and Intel processor. In addition, it is hard to find a suitable version driver, as there are many types of hosts. Another reason is that some hosts use embedded software, so that the installation and uninstallation of drivers and applications can only be achieved by upgrading the equipment of the hosts. The performance of the host which can be installed drivers may become poor because of the installation and uninstallation of the driver, so that the use of external devices is limited. Simultaneously, the resources such as the memory and interfaces of these hosts are relatively limited, so that it is impossible for pre-integrating various drivers and applications to the host.

In view of the above, the current external device extension methods and external devices cannot accommodate the situation of diversifying hosts and external devices, the hosts of a combination other than Windows operating system and Intel processors, and situations which require great computing ability and can only support U-disks, micro SD cards, SD cards or the internet, or transfer files through Bluetooth, IR, or WIFI under FTP and OBEX protocols, but cannot use other external devices.

SUMMARY OF THE PRESENT INVENTION

The main object of the present invention is to provide an external device extension method and an external device for avoiding the installation of drivers and specified applications on hosts during an external device extension process, whereby the external device is simulated as a standard storage device, the host reads and writes files and directories so as to operate with the external device, so that by the general supporting of storage device and flexibility of the file system, the external device is capable of being plug-and-play on computers and various smart appliances.

Additional advantages and features of the invention will become apparent from the description which follows, and may be realized by means of the instrumentalities and combinations particular point out in the appended claims.

According to the present invention, the foregoing and other objects and advantages are attained by an external device extension method comprising the following steps.

(a) Set a correspondence between one or more names selected from operation names, parameter names, data names, device status names, and operation commands and/or data of an external device in the external device, and establish rules of a file system associated with the correspondence, wherein the operation names, the parameter names, the data names and the device status names are respectively character strings for a user to distinguish different operations, parameters, data and device statuses.

(b) Initialize the external device as a standard external storage device via firmware of the external device when the external device is activated, and initialize the file system thereof according to the rules.

(c) Initialize the operation names, the parameter names, the data names and the device status names as one or more simulated regular directories and/or files, wherein name extensions of the files are set according to the data format.

(d) Execute corresponding operations commands of the external device when the external device receives a standard request from a host for reading and/or writing the directories and/or files, process written data, and return formatted data requested by the host in response to a reading request.

Preferably, the method further comprises a step of setting the correspondence between one or more names selected from the operation names, the parameter names, the data names, the device status names, and the operation commands and/or data of the external device in the external device, and the rules of the file system associated with the correspondence in the firmware of the external device, and exporting partial or all of the correspondence and the rules, which are in one or more configuration files, to the file system for a user to copy and modify.

Preferably, the method further comprises a step of modifying the correspondence between one or more names selected from the operation names, the parameter names, the data names, the device status names, and the operation commands and/or data of the external device in the external device by the firmware in response to the configuration files and/or operating result, establishing new rules of the file system based on the modified correspondence, and updating the file system.

Preferably, the method further comprises a step of executing corresponding operation commands of the external device by the firmware when the host reads clusters, based on a correspondence between the directories and/or files, and the clusters of the storage device.

Preferably, the method further comprises a step of pointing a second cluster and subsequent clusters of the plurality of directories and files to a same location by the firmware so as to adjust to a file system with a limited size.

Preferably, the method further comprises a step of executing operation commands of the external device associated with each level of the directories one by one when the firmware receives a request from the host for reading and writing directories and/or files under a multi-level directory.

Preferably, in the above method, the standard external storage device in the step (b) is selected from a group consisting of a U disk, a micro SD card, a SD card, a FTP server, an OBEX device, and a network storage device.

The present invention further provides an external device comprising: an storage device interface provided on the external device, and a firmware for implementing standard function operation requests of the storage device interface, wherein when the external device connects to a host, the firmware communicates with the host according to the standard of the storage device interface, the host identifies the external device as a standard external storage device, wherein one or more of operation names, parameter names, data names and device status names which are supported by the external device are simulated as one or more regular directories and/or files, wherein when the external device receives a standard request from the host for reading and/or writing the directories and/or files, corresponding operation commands of the external device are executed, written data is processed, and formatted data requested by the host is returned to the host in response to a reading request.

Preferably, the external device is a digital TV stick, wherein the digital TV stick contains one or more simulated files of "program name .ts", and "program name. MPG", wherein when the external device receives a request from the host for reading the files, the digital TV stick, which initializes into a receiving state, receives program data, and returns formatted data to the host in the format of the files.

Preferably, the digital TV stick contains a plurality of digital TV modules of different types, wherein programs thereof are present as different named files for a user to play.

Preferably, the external device is a picture printer, wherein the picture printer contains one or more simulated directories using printing options as names, wherein when the picture printer receives a request from the host for writing a picture file, the picture printer is initialized into a receiving state for receiving the picture file, wherein after the picture printer has received data of the picture file transmitted from the host, the picture is printed according to a predetermined printing option.

Preferably, the external device is a multi-function complex device, wherein the complex device comprises one or more device and device parameters simulated directories and wave files, wherein when the complex device receives a request from the host for reading/writing the directory, the corresponding device parameters are used to initialize the corresponding devices, wherein when the complex device receives a request from the host for reading the wave files, the complex device is initialized into a data acquiring state designated by the file names, and the acquired data is returned to the host in the format of the wave files.

In comparison with the conventional arts, the external device extension method and the external device of the present invention have the following advantages.

The use of the external devices does not need the installation of drivers, and even the special applications are optional. And because the numbers of the directories and/or files are almost infinite, so that all functions of the external devices are accessible and can be used, and thus it is possible for some smart appliances using embedded software to be connected to and use the external devices. For some hosts with different interfaces, it only needs an interface adapter. In addition, an operation on files and directories is one of the most common operations, and an ordinary user can use it skillfully. The external device also can be shared like files in the network for other hosts on the network to use it.

The digital TV stick of the present invention not only can be used with computers, but also can be used with devices having file playing capability, such as TV sets, MID devices, PND devices, and media players. In comparison with the conventional set-top boxes, the costs are lower, and the connection is simple. There is no need for additional power supply and remote controllers. Compression signals are transmitted in pure digital format. The requirement for bandwidth is low, the transmission loss is low. And it is convenient for connecting and using a plurality of different digital TV modules.

The picture printer of the present invention can be used with various new or old computers and other smart appliances without need to install drivers. Upon printing, a plurality of existing settings can be used, so that there is no need for any other settings. The picture printer can batch print pictures of different formats simultaneously, and also support non-standard printer operations such as picture cutting.

The complex device with the radio set, multimeter, and the oscillograph can be used with various new or old computers and various appliances such as cell phones, so that these new or old computers and appliances can be a multi-function device.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

The external device extension method comprises the following steps.

Set one or more names selected from a group consisting of operation names, parameter names, data names, and device status names in the external device, set the correspondence between the above mentioned names and commands and/or data operated by the external device, establish rules of file system according to the correspondence. The operation names, parameter names, data names, and device status names are character strings for a user to identify different operations, parameters, data and device statuses.

When activated, the external device is initialized as a standard external storage device and the file system is initialized according to the above rules.

The operation names, parameter names, data names, and device status names are respectively initialized as one or more directories and/or files, the name extension of the file is set according to the format of data.

When the external device receives a request for a standard reading and/or writing of directory and/or file from the host, execute corresponding operating commands of the external device, process the written data, and return formatted data requested by the host according to the read request.

Figure 1:
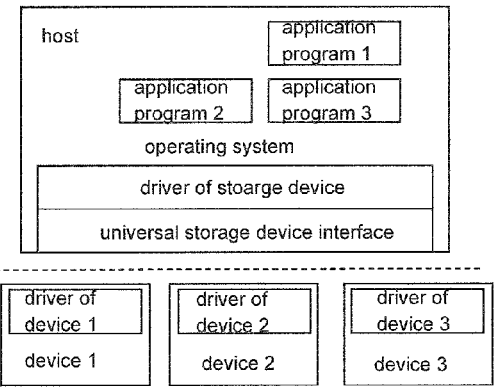
FIG. 1 is a schematic view illustrating the application system of the present invention.

Because of the general support of the storage device, the differences of the external device are unified and defined as different directories and/or files which are supported by the host, the differences of different external devices are respectively held in position within each external device, so that each of the external devices does not need any drivers nor special applications. As shown in FIG. 1 of the drawings, the external device can plug-and-play on various new and old computers and various smart appliances via universal storage device interfaces.

The external device of the present invention is provided with storage device interfaces and firmware for implementing standard operation requests of the storage device interfaces.

Figure 2:
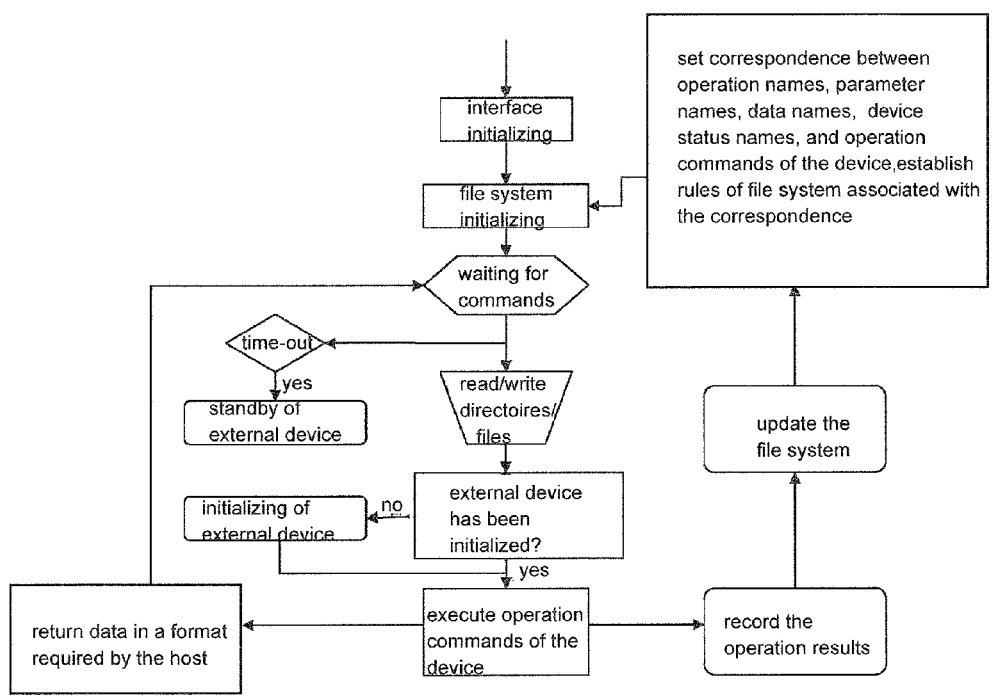
FIG. 2 is a flow chart illustrating a firmware of an external device according to a preferred embodiment of the present invention.

Referring to FIG. 2 of the drawings, the firmware communicates with the host according to storage device interface standards, so that the external device is identified as a standard storage device by the host. The file system is initialized according to the settings, establish rules of the file system according to the correspondence between the operation names, the parameter names, the data names and the device status names in the external device, and commands and/or data operated by the external device, initialize the operation names, the parameter names, the data names and the device status names which are supported by the external device as one or more directories and/or files. When the firmware receives a standard request from the host, for reading the directory, the operation commands of the external device associated with the directory names are executed, and the executed result is formatted as a directory content data according to the request of the host and the directory content data is returned to the host. When the firmware receives a standard request from the host for writing the directory, the operation commands of the external device associated with the directory names are executed, the operation commands of the external device associated with each level directory names are executed when a multi-level directory is written. When the firmware receives a standard request from the host for writing the file, the operation commands of the external device are executed, the corresponding data is received and processed according to the file name, the name extension, and the file header of the file. When the firmware receives a standard request from the host for reading the file, the data is collected and formatted associated with the content and format according to the file name and the name extension of the file, then the data is returned to the host. The host can read and write the directory and the file stage-to-stage through a Graphical User Interface, or read and write the files and directory under a multi-level directory by means of command lines or program calls.

The firmware is actually an executable program that can run on the external device. The firmware exchange commands, parameters, and data through the directories and/or files reading and/or writing and returns the result and data to the host, so that any techniques of conventional executable programs can be introduced into the external device. The configuration files of the program can be embedded into the unchangeable area or provided in the outer changeable area. The configuration files may be put together in one configuration file or distributed in a plurality of configuration files. The configuration files can be static files or dynamically generated files.

The above mentioned storage device interfaces of the host include conventional serial interfaces, parallel interfaces, PCI external controller interfaces, USB interfaces, IEEE 1394 FireWire interfaces, SD memory card interfaces developed from SDIO interfaces, network interfaces, infra-red interfaces, Bluetooth and WIFI wireless connecting interfaces etc.

The above mentioned standard storage devices include U disks, micro SD cards, SD cards, network storage devices, FTP servers, and OBEX devices. The directory content data contains formatted data include devices statuses, useable operations names, parameter names, and data names after executing the directory name associated operation commands of the external device. The directories and/or files associated with the operation commands of the external device, which can be combined into the formatted data and return to the host in a same manner as the directories and/or files of a real storage device, can be identified by labeling or designating with predetermined locations in the external device.

The applications of the host can be general file management or treatment applications, or applications and universal virtual driver specially compiled for the external device, so as to fit the current using habits of the user.

When necessary, the external device can keep the operating result and data in memory and store, so that the user may use them for several more times.

The directories and/or files reading and writing corresponding operation commands in the external device can be a single operation command of a device processor register, or operation commands series for setting parameters and/or executing operations.

The correspondence of the directories and/or files of the external device and the operation commands of the external device can be direct correspondence or indirect correspondence. In devices such as simulated U disks, micro SD cards, and SD cards, the external device can simultaneously execute corresponding commands series while reading and writing the clusters associated with the directories and/or files. For devices such as FTP severs and OBEX devices which directly read and write the directories and/or files, corresponding commands series are executed while reading and writing the directories and/or files.

The correspondence of the directories and/or files of the external device and the operation commands of the external device, and the rules established based on the correspondence can all or partially be stored in one or more configuration files for the firmware to initialize the file system. Alternatively, they are all or partially stored in the firmware, when the firmware is initializing the file system, the correspondence and rules are exported to the file system as configuration files for a user to copy and modify.

The external device is selected from a group consisting of a real external device of a single function, a combination device of multi-function, a plurality of devices simulated by a device.

The method of the present invention can be introduced into a digital TV stick that can be an external device of computers, netbooks, cell phones, TV sets, Mobile Internet Devices, Pictorial Navigation Devices, and media players.

The digital TV stick uses USB or SDIO interfaces to connect with hosts such as smart appliances and computers, and initializes as a storage device of the host, such as a U disk, a micro SD card or a SD card, containing a directory of "program search", "electronic program list" and the like, and a plurality of files using program names as names and .TS or .MPG as the name extension.

When the user opens the directory of "program search", the host sends a command, which is to read the cluster information associated with the directory of "program search", to the digital TV stick, the digital TV stick executes the program searching command associated with the cluster, formats found program with a name of "program name .TS", or/and "program name. MPG" as directory content data and returns the directory content data to the host, the correspondence of each file and the cluster, and the commands of the digital TV stick executed when receiving the program is stored.

The commands like "program search" executing require a relatively long period of time, in order to prevent misoperations when the host is scanning the directory and provide an option for the user to cancel the operation, files such as "program search .TS", "program name. MPG", "program name .TXT" or other files which are supported by the host can be introduced to replace the directory of "program search". The progress bar of file content and/or player shows the progress of the searching process from time to time, the user may cancel the reading of the file to give up the grogram search process before the search process is finished.

When the user opens a file named "program name .TS", or "program name. MPG", the host operates on the player which is capable of processing the file, the player sends a command to the digital TV stick for reading the cluster data associated with the file and simultaneously reads and plays the received data. The digital TV stick obtains the required operation commands for receiving the program according to the pre-stored correspondence and executes the commands, the digital TV data are then received and returned to the host in a file transmitting format. The electronic program list data of the digital VT data can be packaged in the file as subtitles in response to other operation commands selected by the user, and simultaneously can be stored at locations associated with the directory of the "electronic program list" in a format of text file.

When the user opens the directory "electronic program list", the host sends a command to the digital TV stick for reading the cluster data associated with the directory "electronic program list", the digital TV stick read data of the electronic program list from locations associated with the electronic program list, and return the data to the host in a format of directory data.

When the user opens a file named "program name .TXT", the host runs on a text file display program to process the .TXT file, the text file display program sends a command to the digital TV stick for reading the cluster data associated with the file named "program name .TXT", and simultaneously opens the text file display program to read and display the received text file. The digital TV stick returns the electronic program list data to the host in the data format of the file.

When the digital TV stick connects to a computer, it is initialized as a storage device and a BDA device of a standard Microsoft broadcast driver system of the host for the user to choose one to operate. Alternatively, the digital TV stick is initialized as a storage device of the host.

When initialized as a storage device, in order to provide same user experience as a standard BDA device, special applications may be introduced to read and write different files and directories according the requirements of the player and display them according to the favor of the user.

The correspondence between the files and directory, and the operation commands of the external device are stored as configuration files for the user to read, write and copy. The configuration files are placed at predetermined locations or are designated with predetermined characters for the software of the digital TV stick to identify, thereby simulated directories and/or files of the external device are established. The configuration files can be real storage files or obtained from formatting data of other formats in real storage when the user is reading, writing, and copying configuration files.

The digital TV stick may consist of two parts, one is a BDA device of a standard Microsoft broadcast driver system, and the other is a module for emulating the BDA device as a storage device, so that the conventional BDA device can be used as an external device of another smart appliances.

Depending on the different receiving modules, the digital TV stick can choose one or more of a terrestrial digital TV (DVB-T), a terrestrial high definition digital TV (DVB-TH), a satellite digital TV (DVB-S), cable digital TV (DVB-C), internet TV (IPTV).

Figure 3:
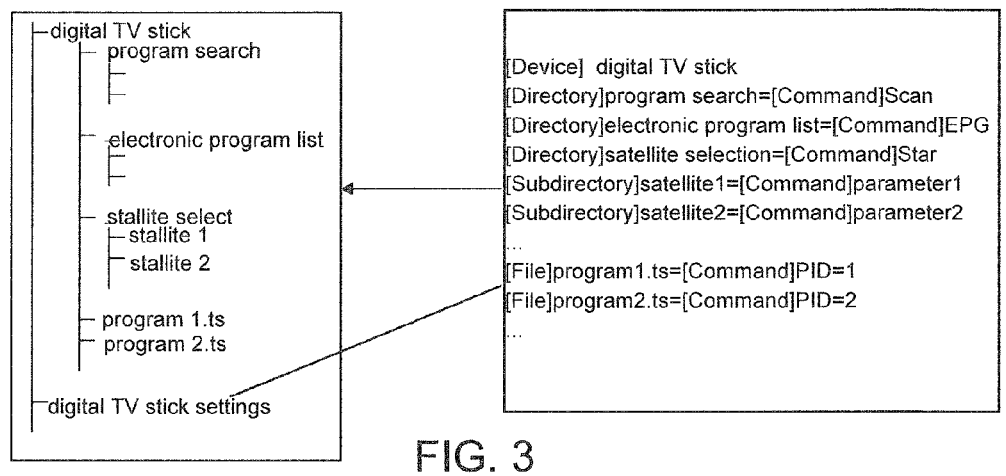
FIG. 3 is a schematic view illustrating the directory of a digital TV stick according to a first preferred embodiment of the present invention.

The digital TV stick is shown in FIG. 3, and illustrated in the following description.

The digital TV stick, which comprises a RF tuner, a digital TV demodulator, a USB controller, and a USB interface connect with the host via the USB interface and is supplied with electric power via the USB interface. The USB controller comprises a cpu, a memory, a flash memory, a USB interface controller and embedded programs. The embedded programs enable the standard function operation requests of the storage device interface. The root directory contains a file named "digital TV stick settings .ini", the content of the file is as follows:

[Device] digital TV stick
[Directory]program search×[Command]Scan
[Directory]electronic program list×[Command]EPG
[Directory]satellite selection×[Command]Star
[Subdirectory]satellite1×[Command]parameter1
[Subdirectory]satellite2×[Command]parameter2DD
. . .
[File]program1.ts×[Command]PID×1
[File]program2.ts×[Command]PID×2
. . .

The digital TV stick, when connecting to the host, is initialized as a standard storage device such as U disk. Except the files in the flash memory, a series of directories and/or files are simulated corresponding to the content of the file of "digital TV stick settings .ini". The root directory contains a directory named "digital TV stick". The content under the directory of "digital TV stick" are directories with names of the names between "[Device]" and "=" and files with names of the names between "[File]" and "=" in the file of "digital TV stick settings .ini". These directories and subdirectories thereof contain the same content as the content of the directory "digital TV stick". The directories with the names of the names between "[Subdirectory]" and "=" only appear in the prior directories of "[Directory]" they belong to.

The file of "digital TV stick settings .ini" can be edited by text editors in computers or other hosts which support text edit or alternatively, can rewrite the content in response to the executing result of the commands via built-in software.

When the built-in software receives the requests from the host to read the directories and/or files under the directory of "digital TV stick", execute commands and parameters associated with "[Command]", so as to control the RF tuner and the digital TV demodulator. When receiving the requests from the host to read the files under the directory of "digital TV stick", the media streams transmitted from the digital TV demodulator is transmitted to the host, and simultaneously the received electronic program list is stored under the directory of "digital TV stick/electronic program list" in a text format.

Therefore, the digital TV stick not only can be used in various computers without installation of drivers, but also can be used with TV sets, media players which have media streams playing capabilities. There is no need for special electric power supplies nor remote controllers. The user needs only to operate the files and directories with the controllers of the TV sets and DVDs to achieve the operations of program searching and shifting, the functions of the conventional digital TV sticks such as power supply, remote control, and indication can also be kept.

The method of the present invention can be used on a picture printer which can be an external device of computers, netbooks, cell phones, digital cameras, Mobile Internet Devices, and Pictorial Navigation Devices.

The picture printer can connect with smart appliances and computers via wire or wireless interfaces. When activated, it is initialized as a storage device such a FTP server and contains a plurality of directories with names of sizes of pictures, quality of printing, sizes of blank, types of media, and the combinations thereof.

When receiving the request from the host for writing files into the directory, the picture printer is initialized into a printing state associated with the directory and begins to collect data, after finishing receiving the data, process and print the pictures corresponding to the options.

The picture printer is illustrated in details in the following description.

The picture printer, which comprises a picture processing module, a printing implementing mechanism, a wireless network (wifi) module, a control module and a power supply, connect with each host via the wireless network (wifi), and simulated as a FTP server. The control module comprises a CPU, a memory and embedded software. The embedded software achieves storage device interfaces via standard functions of the FTP severs. The root directory contains a file of "picture printer .ini" with the following content by way of example:

[Device] picture printer
[Subdirectory]cut×[Command]split
[Directory]/camera/pic×[Directory]1×1
[Directory]/=[Directory]1×1
[Directory]/picture printer×[Directory]1×1
[Directory]special effect×[Command]tune
[Subdirectory]black and white×[Command]blackwhite
. . .
[Directory]1×1×[Command]1×1
[Directory]2×4×[Command]2×4
[Directory]3×4×[Command]3×4
. . .

The picture printer is initialized as a FTP server when activated. Except the files in the flash memory, a series of directories and/or files are simulated corresponding to the content of the file of "picture printer .ini". The root directory contains a directory named "picture printer". The content under the directory of "picture printer" are directories with names of the names between "[Device]" and "=" and files with names of the names between "[File]" and "=" in the file of "picture printer settings .ini". These directories and subdirectories thereof contain the same content as the content of the directory of "picture printer". The directories with the names of the names between "[Subdirectory]" and "=" only appear in the prior directories of "[Directory]" they belong to. The root directory contains a directory of "/camera/pic". The pictures shot by a digital camera are stored in this directory as default, the picture printer stores the picture and simultaneously print the pictures of a size of 1×1 according to "[Directory]/camera/pic=[Directory]1×1".

The file of "picture printer settings .ini" can be edited by text editors in computers or other hosts which support text edit. Alternatively, it may rewrite the content in response to the executing result of the commands via built-in software.

When the built-in software receives the requests from the host to read the directories and/or files under the directory of "picture printer", execute commands and parameters associated with "[Command]", so as to control the picture processor and the printing implementing mechanism. When receiving the requests from the host to write the type of the pictures, receive picture data and carry out operations such as processing, printing, and cutting the received pictures according to the predetermined setting requirements.

Therefore, the picture printer not only can be used in various computers without installation of drivers, but also can be used with cell phones, digital cameras which can export pictures. And also, the picture printer enables printing pictures in a batch by means of batch file copying functions provided by the system itself, and support nonprinting operations such as cutting the pictures according to predetermined formats.

The method of the present invention can be used on a multi-function device with a radio set, a multimeter, and an oscillograph, which can be an external device of computers, netbooks, cell phones, digital cameras, Mobile Internet Devices, and Pictorial Navigation Devices.

When this external device connect with a host via SDIO interfaces, it is initialized as a micro SD card and contain directory of the radio set, directory of the multimeter, and directory of the oscillograph.

The directory of the radio set contains "broadcasting station researching", directory of city names defined by the user, and ".WAV" acoustic wave files in names of broadcasting station names. There are ".WAV" acoustic wave files with names of city broadcasting station names under the directory of city names. When the user opens these wave files, the device can control the radio set module to receive signals of the broadcasting station, after an analog-to-digital conversion process, the data are returned to the host in a file format, so that the user can listen to the broadcast of the station with music player programs.

The directory of the multimeter contains a directory of thresholds of the multimeter and "quantum . WAV" acoustic wave files under the directory thereof. After an analog-to-digital conversion process of signals of the multimeter probes, the digital voices corresponding to the values thereof are returned to the host in the format of ".WAV" acoustic wave files, so that the user can use music player programs for the multimeter to measure. Alternatively, the liquid crystal display of the multimeter can be used to display the measurement result.

The directory of the oscillograph contains a directory of options of the oscillograph and "measure.WAV" acoustic wave files under the directory thereof. After an analog-to-digital conversion process of signals of the oscillograph probes, the signals are returned to the host in the format of ".WAV" acoustic wave files, so that the user can use the music player programs which have wave displaying functions as the oscillograph.

The values after the analog-to-digital conversion process also can be transformed as texts and are returned to the host in a lyric format after a formatting process for displaying on a music player with a lyric displaying function.

Figure 4:
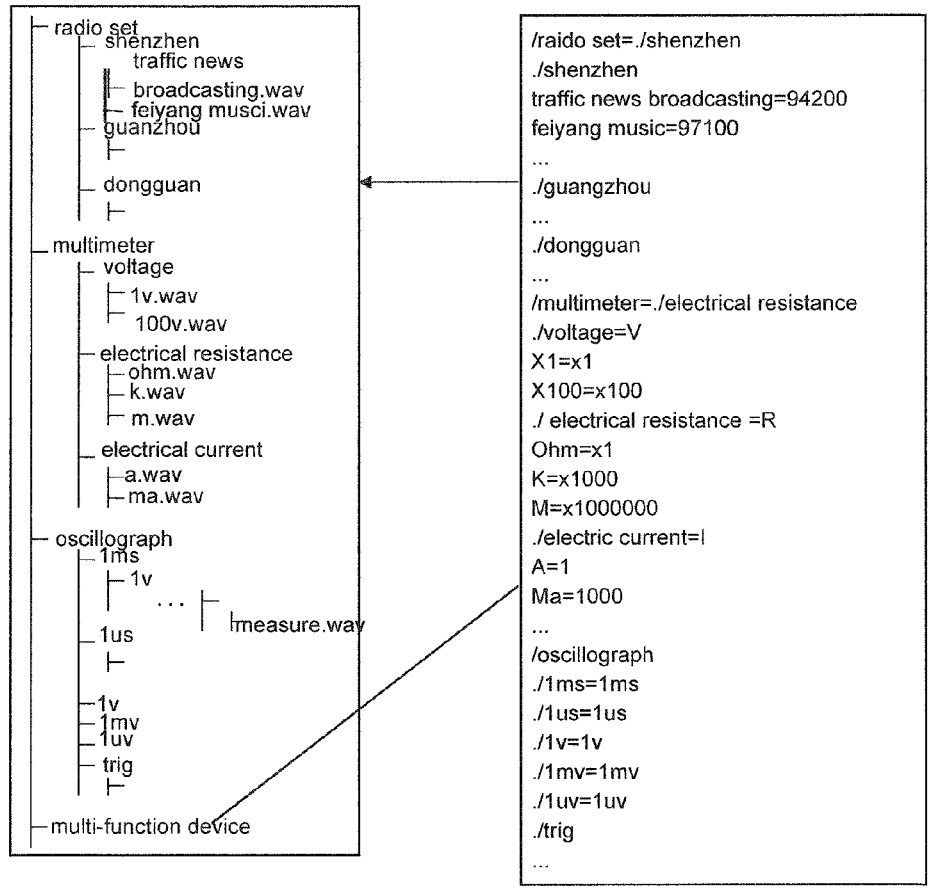
FIG. 4 is a schematic view illustrating the directory of a utility device according to a third preferred embodiment of the present invention

The multi-function device with the radio set, the multimeter, and the oscillograph is illustrated in the following description as an example and shown in FIG. 4. The multi-function device with the radio set, the multimeter, and the oscillograph are The multi-function device with the radio set, the multimeter, and the oscillograph comprises a radio set module, a signal conversion electric circuit, a SDIO controller, a SDIO interface, and a power supply. The multi-function device connects to the host via the SDIO interface and is simulated as a micro SD card. The SDIO controller comprises a CPU, a memory, a SDIO interface controller and embedded software. The embedded software achieves standard functions of micro SD card of the storage device interface. The root directory thereof contains a file of "multi-function device.ini" with the following content by way of example:

/raido setx.shenzhen
./Shenzhen
traffic news broadcasting×94200
feiyang music×97100
. . .
./guangzhou
. . .
./dongguan
. . .
/multimeterx./elecrtrical resistance
./voltage×V
X1××1
X100××100
./electrical resistance ×R
Ohm××1
K××1000
M××1000000
./electric current×I
A×1
Ma×1000
. . .
/oscillograph
./1ms×1ms
./1us×1us
./1v×1v
./1mv×1mv
./1uv×1uv
./trig The multi-function device connects to the host and is initialized as a micro SD card. According to the request of the host, except the files in the flash memory, a series of directories and/or files are simulated corresponding to the content of the file of "multi-function device .ini". The series of directories and/or files contains the following content.

A directory of the radio set, a directory of the multimeter, a directory of the oscillograph.

The directory of the radio set contains a city directory and broadcasting station wave files, the city directory also contains broadcasting station wave files.

The directory of the multimeter contains directories of voltage, electrical resistance, electrical current, and the like. Each of these directories contains quantum wave files.

The directory of the oscillograph contains directories of all setting values, and each of the directories of the setting values contains a directory of other setting values and measurement wave files.

The file of "multi-function device .ini" can be edited by text editors in computers or other hosts which support text edit. Alternatively, rewrite the content in response to the executing result of the commands via built-in software.

When the user opens the broadcasting station wave files, the device controls the radio set module to receive the signals of the broadcasting station, after an analog-to-digital conversion process, the data are returned to the host in a file format, so that the user can listen to the broadcast of the station with music player programs.

When the user opens the quantum wave files, the device will select a corresponding shifting electric circuit. After an analog-to-digital conversion process of values, the digital voices associated with the values are found and are returned to the host in the file format, so that the user can hear the measurement result using the music player programs, or view the measurement result displayed on a liquid crystal display.

When the user opens the measure wave files, the device will select a corresponding shifting electric circuit. After an analog-to-digital conversion process of the wave files, the wave files are returned to the host in the file format, so that the user can view the measurement waves via music player programs which have wave displaying functions.

Therefore, the multi-function device of the present invention not only can be used with various computers without the need of drivers, but also can be used with other devices such as cell phones, music players that having a music playing capability.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An external device extension method for enabling an external device to be operated by a host without installing a driver thereto, comprising the following steps:
   (a) setting a correspondence between one or more names selected from operation names, parameter names, data names, device status names, and operation commands and/or data of said external device in said external device, and establishing rules of a file system associated with said correspondence, wherein said operation names, said parameter names, said data names and said device status names are respectively character strings to distinguish different operations, parameters, data and device statuses, wherein said external device is an operational device and is a non-standard storage device;
   (b) initializing said external device as a standard external storage device via a firmware of said external device when said external device is activated, wherein said firmware communicates with said host according to the standard of storage device interface, such that when said external device is connected to said host, said host identifies said external device as said standard external storage to omit said driver of said external device to be installed into said host, and initializing said file system thereof according to said rules;
   (c) initializing said operation names, said parameter names, said data names and said device status names as one or more simulated regular directories and/or files in said external device, wherein name extensions of said files are set according to the data format; and
   (d) executing said directories and/or files corresponding operation commands of said external device when said external device receives a standard request from said host for reading and/or writing said directories and/or files in said external device, processing written data, and returning formatted data requested by said host in response to a reading request.

2. The external device extension method, as recited in claim 1, further comprising a step of setting said correspondence between one or more of said operation names, said parameter names, said data names and said device status names, and said operation commands and/or data of said external device in said external device, and said rules of said file system associated with said correspondence in said firmware of said external device, and exporting partial or all of said correspondence and said rules, which are in one or more configuration files, to said file system for a user to copy and modify.

3. The external device extension method, as recited in claim 1, further comprising a step of modifying said correspondence between one or more of said operation names, said parameter names, said data names and said device status names, and said operation commands and/or data of said external device in said external device by said firmware in response to said configuration files and/or operating result, establishing new rules of said file system based on said modified correspondence, and updating said file system.

4. The external device extension method, as recited in claim 1, further comprising a step of executing corresponding operation commands of said external device by said firmware when said host reads clusters, based on a correspondence between said directories and/or files, and said clusters of said storage device.

5. The external device extension method, as recited in claim 1, further comprising a step of pointing a second cluster and subsequent clusters of the plurality of directories and files to a same location by said firmware so as to adjusting to a file system with a limited size.

6. The external device extension method, as recited in claim 1, further comprising a step of executing operation commands of said external device associated with each level of said directories one by one when said firmware receives a request from said host for reading/writing directories and/or files under a multi-level directory.

7. The external device extension method, as recited in claim 1, wherein said standard external storage device in the step (b) is selected from a group consisting of a U disk, a micro SD card, a SD card, a FTP server, an OBEX device, and a network storage device.

8. An external device, which is an operational device for communicating with a host, comprising: an storage device interface provided on said external device, and a firmware for implementing standard function operation requests via said storage device interface, wherein when said external device connects to said host, said firmware communicates with said host according to the standard of said storage device interface, said host identifies said external device as a standard external storage device to omit a driver of said external device to be installed into said host, wherein one or more names selected from operation names, parameter names, data names and device status names which are supported by said external device are simulated as one or more regular directories and/or files in said external device, wherein when said external device receives a standard request from said host for reading and/or writing said directories and/or files, corresponding operation commands of said external device are executed, written data is processed, and formatted data requested by said host is returned to said host in response to a reading request.

9. The external device, as recited in claim 8, wherein said external device is a digital TV stick, wherein said digital TV stick contains one or more simulated files of "program name .ts", and "program name. MPG", wherein when said external device receives a request from said host for reading said files, said digital TV stick, which initializes into a receiving state, receives program data, and returns formatted data to said host in a format of said files.

10. The external device, as recited in claim 9, wherein said digital TV stick contains a plurality of digital TV modules of different types, wherein programs thereof are present as different named files for a user to play.

11. The external device, as recited in claim 8, wherein said external device is a picture printer, wherein said picture printer contains one or more simulated directories using printing options as names, wherein when said picture printer receives a request from said host for writing a picture file, said picture printer is initialized into a receiving state for receiving said picture file, wherein after said picture printer has received data of said picture file transmitted from said host, said picture is printed according to a predetermined printing option.

12. The external device, as recited in claim 8, wherein said external device is a multi-function complex device, wherein said complex device comprises one or more devices, and simulated directories using device parameters as names, wherein when said complex device receives a request from said host for reading/writing said directory, said corresponding device parameters are used to initialize said corresponding devices.

\* \* \* \* \*